Patented Dec. 8, 1936

2,063,835

UNITED STATES PATENT OFFICE 2,063,835

CHEMICALLY-RESISTANT MATERIAL

Marcus K. Billson, Honolulu, Territory of Hawaii, assignor to Hawaiian Hume Concrete Pipe Company, Limited, Honolulu, Territory of Hawaii, a corporation of Hawaii No Drawing. Application February 5, 1936, Serial No. 62,545

9 Claims. (Cl. 106—23)

My invention relates to chemically-resistant material and it has for its principal object to provide a material suitable for use in coating pipes, tubes and the like to render them impervious to liquids and gases and in particular to the deleterious gas fumes, acids and alkalis commonly encountered in domestic and industrial sewerage. The material is especially suitable for lining concrete pipes, but it may be applied with equally good results to metal pipes and conduits either as a lining or an exterior coating or both.

In addition to being chemically-resistant, the material is also characterized by the smooth, hard and glossy finish which it imparts to the article to which it is applied. Another and most desirable characteristic of the material is that it may be formed into hardened castings or pigs to be stored, which may be subsequently remelted, when desired for use, without destroying the original effective properties of the material.

The principal and essential ingredients of the material are sulphur, silica and rubber. Any pure commercial sulphur may be used and it can be either in lump or flour form. The silica, which may also be of a pure commercial variety, is preferably not coarser than 80 mesh or finer than 100 mesh. The rubber may be in substantially any desirable form. For example, it may be in the form of rubber latex or vulcanized rubber, satisfactory results having been obtained with both. If rubber latex is used, it should be in a suitable solution. A benzol solution of rubber latex has been found to give excellent results. If vulcanized rubber is used, it should be employed in a finely divided state.

In addition to the above ingredients, the material may also advantageously include beta naphthol which serves to make the mixture smoother and to make it quicker melting.

The ingredients are preferably combined in approximately the following percentages:

| | Percent |
|---|---|
| Pure commercial sulphur | 51 |
| Pure commercial silica | 48 |
| Rubber | ½ |
| Beta naphthol | ½ |

The parts are compounded by first being thoroughly mixed and then heated in any suitable cooker or receptacle until the mixture becomes a dark brown viscous liquid. During the heating operation, it is preferable to stir the mixture and, after the mixture reaches the desired viscosity, the heating and stirring should be continued for several minutes to insure complete reaction between the ingredients and the escape of any gas which may be generated. The time of heating necessarily varies with the quantity of material.

After cooling for a short time, the material attains its most liquid state and it is then ready for use. It may either be applied directly to the article to be coated or it may be poured into castings or pigs which may be conveniently stored. Subsequent remelting of the castings or pigs may be easily effected, whenever the material is desired for use, and the remelted material will be found to possess all of the effective and desirable properties of the original mixture.

In the finished material, a small part of the sulphur combines with the rubber to form a crude rubber sulphide having the empirical formula $C_{10}H_{16}S_2$ (polypreme disulphide). The rubber eliminates surface crystallization of the material upon cooling and it imparts to the material a smooth, hard and glossy finish whereby a non-porous coating or lining completely free of voids and gas holes is produced.

In lining a concrete or other pipe, the pipe may be placed upon or within any type of horizontal centrifugal spinning machine and suitable pieces of metal or rubber or combinations of both are placed over the ends of the pipe. The pipe is then rotated and the lining material introduced therein by means of any suitable chute or spraying device and spun into place by centrifugal force. Other methods for lining a pipe with the material may be used, such, for example, as standing the pipe vertically, placing a core of suitable material within the pipe and pouring the lining material between the core and the pipe and then, after the material has cooled and hardened, removing the core by breaking or mechanical means. Moreover, it will be appreciated that the material may be readily applied to the exterior surface of a pipe by spraying, pouring, casting or any other suitable method.

While the proportions heretofore given of the various ingredients comprising the material are those which have been found to produce the best results, those skilled in the art will appreciate that the proportions may be varied slightly without materially affecting the desirable and fundamental characteristics of the resulting material.

This application is a continuation in part of my copending application Serial No. 757,073, filed December 11, 1934.

What I claim is:

1. A protective coating having a smooth and hard finish for pipes, tubes and the like, said coating consisting essentially of silica and sulphur in substantially equal proportions and rubber in an amount not exceeding a minor fraction of the amount of sulphur.

2. A protective coating for pipes, tubes and the like consisting essentially of silica and sulphur in substantially equal proportions and not more than 1% of rubber.

3. A protective coating for pipes, tubes and the like containing approximately 51% sulphur, 48% silica, ½% rubber and ½% beta naphthol.

4. A protective coating having a smooth and hard finish for pipes, tubes and the like, said coating consisting essentially of silica and sulphur in substantially equal proportions and rubber latex in solution in an amount not exceeding a minor fraction of the amount of sulphur.

5. A protective coating for pipes, tubes and the like consisting essentially of substantially equal parts of silica and sulphur and approximately 1% of substantially equal parts of rubber latex in solution and beta naphthol.

6. A protective coating for pipes, tubes and the like consisting essentially of sulphur and silica in approximately equal proportions and not more than 1% of rubber latex in a suitable solvent.

7. A protective coating having a smooth and hard finish for pipes, tubes and the like, said coating consisting essentially of silica and sulphur in substantially equal proportions and finely ground vulcanized rubber in an amount not exceeding a minor fraction of the amount of sulphur.

8. A protective coating for pipes, tubes and the like consisting essentially of silica and sulphur in substantially equal proportions and not more than 1% of finely divided vulcanized rubber.

9. A protective coating for pipes, tubes and the like consisting essentially of substantially equal parts of silica and sulphur and approximately 1% of substantially equal parts of finely divided vulcanized rubber and betal naphthol.

MARCUS K. BILLSON.